US008091868B2

(12) United States Patent
Robb et al.

(10) Patent No.: US 8,091,868 B2
(45) Date of Patent: Jan. 10, 2012

(54) WVT DESIGN FOR REDUCED MASS AND IMPROVED SEALING RELIABILITY

(75) Inventors: Gary M. Robb, Honeoye Falls, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 839 days.

(21) Appl. No.: 12/178,182

(22) Filed: Jul. 23, 2008

(65) Prior Publication Data

US 2010/0019400 A1  Jan. 28, 2010

(51) Int. Cl.
*B01F 3/04* (2006.01)

(52) U.S. Cl. ...... 261/101; 261/104; 261/107; 29/890.09; 429/400; 429/413; 429/452; 429/471; 429/535

(58) Field of Classification Search .................. 261/101, 261/104, 107; 29/890.09; 429/400, 413, 429/452, 471, 535
See application file for complete search history.

(56) References Cited

U.S. PATENT DOCUMENTS

| | | | | |
|---|---|---|---|---|
| 3,539,395 A * | 11/1970 | Bartas | ............ | 429/414 |
| 3,558,361 A * | 1/1971 | Christianson | ............ | 429/422 |
| 4,175,165 A * | 11/1979 | Adlhart | ............ | 429/457 |
| 4,272,353 A * | 6/1981 | Lawrance et al. | ............ | 204/283 |
| 4,391,616 A * | 7/1983 | Imamura | ............ | 95/92 |
| 4,429,735 A * | 2/1984 | Nomaguchi et al. | ............ | 165/60 |
| 4,450,212 A * | 5/1984 | Feigenbaum et al. | ........ | 429/457 |
| 4,514,475 A * | 4/1985 | Mientek | ............ | 429/460 |
| 4,604,331 A * | 8/1986 | Louis | ............ | 429/511 |
| 4,689,280 A * | 8/1987 | Gionfriddo | ............ | 429/469 |
| 4,997,727 A * | 3/1991 | Bossel | ............ | 429/465 |
| 5,049,459 A * | 9/1991 | Akagi | ............ | 429/486 |
| 5,226,298 A * | 7/1993 | Yamamoto et al. | ............ | 62/3.4 |
| 5,262,249 A * | 11/1993 | Beal et al. | ............ | 429/434 |
| 5,300,370 A * | 4/1994 | Washington et al. | ......... | 429/434 |
| 5,773,161 A * | 6/1998 | Farooque et al. | ............ | 429/509 |
| 5,775,121 A * | 7/1998 | Kuma et al. | ............ | 62/314 |
| 5,858,569 A * | 1/1999 | Meacher et al. | ............ | 429/413 |
| 5,879,826 A * | 3/1999 | Lehman et al. | ............ | 429/413 |
| 5,913,360 A * | 6/1999 | Stark | ............ | 165/66 |
| 6,171,374 B1 | 1/2001 | Barton et al. | | |
| 6,372,374 B1 * | 4/2002 | Li et al. | ............ | 429/470 |
| 6,383,677 B1 * | 5/2002 | Allen | ............ | 429/454 |
| 6,471,195 B2 | 10/2002 | Shimanuki et al. | | |
| 6,536,514 B1 * | 3/2003 | Sugiyama et al. | ............ | 165/166 |
| 6,653,012 B2 | 11/2003 | Suzuki et al. | | |
| 7,036,466 B2 | 5/2006 | Goebel et al. | | |
| 7,156,379 B2 | 1/2007 | Tanihara et al. | | |
| 7,435,502 B2 * | 10/2008 | Breault et al. | ............ | 429/532 |

(Continued)

*Primary Examiner* — Robert J Hill, Jr.
*Assistant Examiner* — Christopher P Jones
(74) *Attorney, Agent, or Firm* — Fraser Clemens Martin & Miller LLC; J. Douglas Miller

(57) ABSTRACT

A membrane humidifier for a fuel cell system is disclosed wherein the membrane humidifier includes a plurality of membrane layers, a first pair of spaced apart sealing bars disposed between a first membrane layer and a second membrane layer adjacent to perimeter edges thereof to form a first flow channel, a second pair of spaced apart sealing bars disposed between the second membrane layer and a third membrane layer adjacent to perimeter edges thereof to form a second flow channel, and a plurality of supports, wherein a first support is disposed adjacent the second planar layer and extending between the second pair of spaced apart sealing bars, and a second support is disposed adjacent the third planar layer and extending between the second pair of spaced apart sealing bars.

20 Claims, 8 Drawing Sheets

U.S. PATENT DOCUMENTS

| | | | |
|---|---|---|---|
| 7,855,028 B2* | 12/2010 | Ryu et al. | 429/457 |
| 2002/0164513 A1* | 11/2002 | Asano et al. | 429/32 |
| 2003/0148164 A1* | 8/2003 | Koch et al. | 429/34 |
| 2004/0209150 A1 | 10/2004 | Rock et al. | |
| 2005/0064261 A1* | 3/2005 | Breault et al. | 429/32 |
| 2005/0064263 A1* | 3/2005 | Goebel et al. | 429/34 |
| 2005/0235673 A1* | 10/2005 | Sueoka et al. | 62/271 |
| 2005/0260469 A1 | 11/2005 | Forte | |
| 2006/0029837 A1 | 2/2006 | Sennoun et al. | |
| 2006/0086125 A1* | 4/2006 | Sueoka et al. | 62/304 |
| 2006/0169142 A1* | 8/2006 | Rode et al. | 96/129 |
| 2007/0042237 A1* | 2/2007 | Sorkin et al. | 429/17 |
| 2009/0092863 A1* | 4/2009 | Skala | 429/12 |
| 2010/0099000 A1* | 4/2010 | Kanba et al. | 429/34 |
| 2011/0039167 A1* | 2/2011 | Zhang et al. | 429/413 |

* cited by examiner

WVT DESIGN FOR REDUCED MASS AND IMPROVED SEALING RELIABILITY

FIELD OF THE INVENTION

The invention relates to a fuel cell system and more particularly to water vapor transfer unit for a fuel cell system.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cell systems may also be used as stationary electric power plants in buildings and residences, as portable power in video cameras, computers, and the like. Typically, the fuel cell systems generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell system is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells, depending upon the context in which it is used. The plurality of cells is typically bundled together and arranged to form a stack, with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion media (hereinafter "DM's") or diffusion layers that are formed from a resilient, conductive, and gas permeable material such as carbon fabric or paper. The DM's serve as the primary current collectors for the anode and cathode, as well as provide mechanical support for the MEA. Alternatively, the DM may contain the catalyst layer and be in contact with the membrane. The DM's and MEA are pressed between a pair of electrically conductive plates which serve as secondary current collectors for collecting the current from the primary current collectors. The plates conduct current between adjacent cells internally of the stack in the case of bipolar plates and conduct current externally of the stack in the case of monopolar plates at the end of the stack.

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the protons through the PEM. The electrons are captured as useful energy through an external circuit and are combined with the protons and oxygen to produce water vapor at the cathode side.

Many fuel cells use internal membranes, such as the PEM type fuel cell which includes proton exchange membranes, also referred to as polymer electrolyte membranes. In order to perform within a desired efficiency range, it is desirable to maintain the membranes in a moist condition. Therefore, it is necessary to provide a means for maintaining the fuel cell membranes in the moist condition. This helps avoid damage to or a shortened life of the membranes, as well as to maintain the desired efficiency of operation. For example, lower water content of the membrane leads to a higher proton conduction resistance, thus resulting in a higher ohmic voltage loss. The humidification of the feed gases, in particular at the cathode inlet, is desirable in order to maintain sufficient water content in the membrane. Humidification in a fuel cell is discussed in commonly owned U.S. Pat. No. 7,036,466 to Goebel et al.; commonly owned U.S. patent application Ser. No. 10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. Pat. No. 7,156,379 to Tanihara et al., hereby incorporated herein by reference in its entirety, and U.S. Pat. No. 6,471,195, hereby incorporated herein by reference in its entirety.

Membrane humidifiers, such as water vapor transfer (WVT) units, have also been utilized to fulfill fuel cell humidification requirements. For the automotive fuel cell humidification application, such a membrane humidifier needs to be compact, exhibit low pressure drop, and have high performance characteristics. Typical membrane humidifiers include a wet plate that includes a plurality of flow channels formed therein adjacent a DM. The flow channels are adapted to convey a wet fluid from the cathode of the fuel cell to the exhaust. Typical membrane humidifiers also include a dry plate that includes a plurality of flow channels formed therein adjacent a DM. The flow channels are adapted to convey a dry fluid from a source of gas to the cathode of the fuel cell. A similar membrane humidifier assembly can be used for an anode side of the fuel cell, or otherwise as desired. To avoid a leak of reactant gas from the wet side to the dry side, the membrane humidifier must be adequately sealed. A loss of reactant gas from the wet side to the dry side or from the dry side to the wet side will affect the humidification level of the reactants flowing through the membrane humidifier, as well as the stoichiometry of the reactants flowing through the fuel cell stack.

The flow channels are typically formed on both sides of the wet plate and the dry plate, which are separated by a web. The web militates against the deformation of the material forming the flow channels. By utilizing the web for support of the plates and flow channels, the overall dimensions of the plates and the flow channels are increased, thereby resulting in increased material and manufacturing costs, as well as an increased fabrication time of the membrane humidifier.

As the overall dimensions of the plates of the membrane humidifier increase, the thermal mass of the membrane humidifier increases. An increase in thermal mass results in an increase in a warm-up time during a starting operation of a fuel cell powered vehicle. During the starting operation, the membrane humidifier is typically warmed by only a flow of cathode reactant. Thus, as the thermal mass of the membrane humidifier increases, the amount of cathode reactant required to warm the membrane humidifier increases.

It would be desirable to a membrane humidifier, wherein the dimensions of the humidifier, the material costs of the membrane humidifier, and the assembly time of the membrane humidifier are minimized.

SUMMARY OF THE INVENTION

Concordant and congruous with the present invention, a membrane humidifier, wherein the dimensions of the humidifier, the material costs of the membrane humidifier, and the assembly time of the membrane humidifier are minimized, has surprisingly been discovered.

In one embodiment, the membrane humidifier assembly for a fuel cell comprises a first substantially planar membrane layer; a second substantially planar membrane layer spaced apart from the first layer; a third substantially planar membrane layer spaced apart from the second layer; a first pair of spaced apart sealing bars disposed between the first layer and the second layer adjacent peripheral edges thereof to form a first flow channel therebetween; a second pair of spaced apart sealing bars disposed between the second layer and the third layer adjacent peripheral edges thereof to form a second flow channel therebetween; a first support disposed adjacent the second layer and extending between the second pair of sealing bars; and a second support disposed adjacent the third planar layer and extending between the second pair of sealing bars.

In another embodiment, the membrane humidifier assembly for a fuel cell comprises a first substantially planar membrane layer; a second substantially planar membrane layer spaced apart from the first layer; a third substantially planar membrane layer spaced apart from the second layer; a first pair of spaced apart sealing bars disposed between the first layer and the second layer adjacent peripheral edges thereof to form a first flow channel therebetween; a first plurality of perforated sealing bars disposed between said first layer and the second layer adjacent peripheral edges thereof and extending between the first pair of sealing bars; a second pair of spaced apart sealing bars disposed between the second layer and the third layer adjacent peripheral edges thereof to form a second flow channel therebetween; a first support disposed adjacent the second layer and extending between the second pair of sealing bars; and a second support disposed adjacent the third planar layer and extending between the second pair of sealing bars.

In another embodiment, the method for making a membrane humidifier for a fuel cell system, the method comprises the steps of providing a plurality of spaced apart and substantially planar layers formed from a membrane, a plurality of sealing bars, and a plurality of supports; providing a first pair of sealing bars and adhering the first pair of sealing bars between a first planar layer and a second planar layer adjacent to peripheral edges thereof to form a first flow channel, providing a second pair of sealing bars and adhering the second pair of sealing bars between the second planar layer and a third planar layer adjacent to peripheral edges thereof to form a second flow channel; providing a first support disposed adjacent to the second planar layer and extending between the second pair of sealing bars and adhering the first support to the second planar layer; and providing a second support disposed adjacent to the third planar layer and extending between the second pair of sealing bars and adhering the second support to the third planar layer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
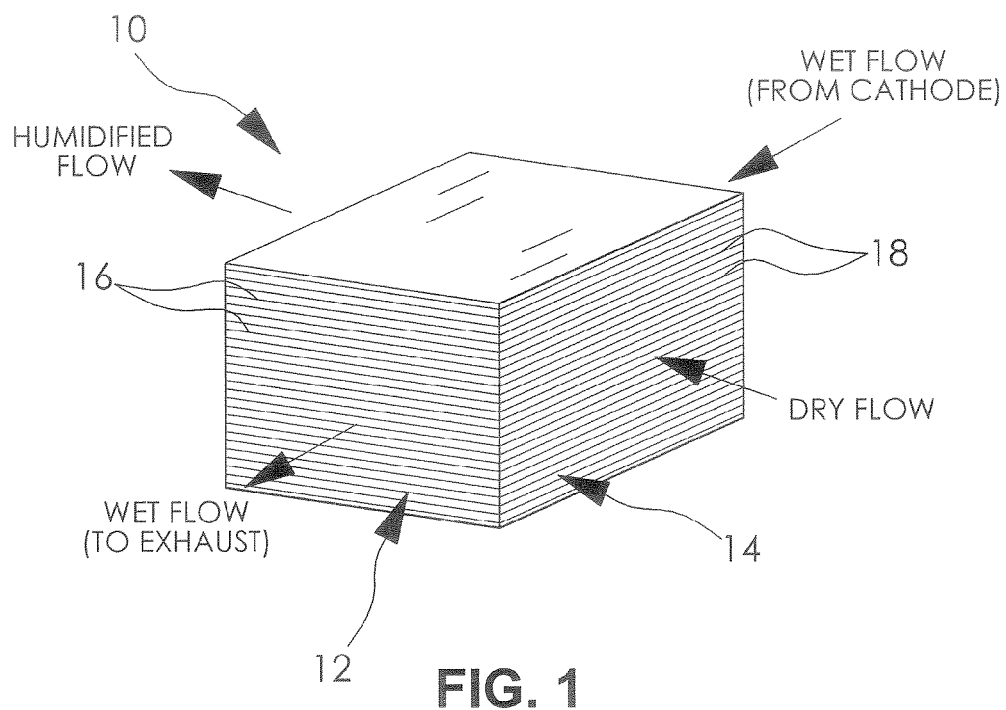
FIG. 1 is a schematic perspective view of a membrane humidifier according to an embodiment of the invention.
Figures 5, 6:
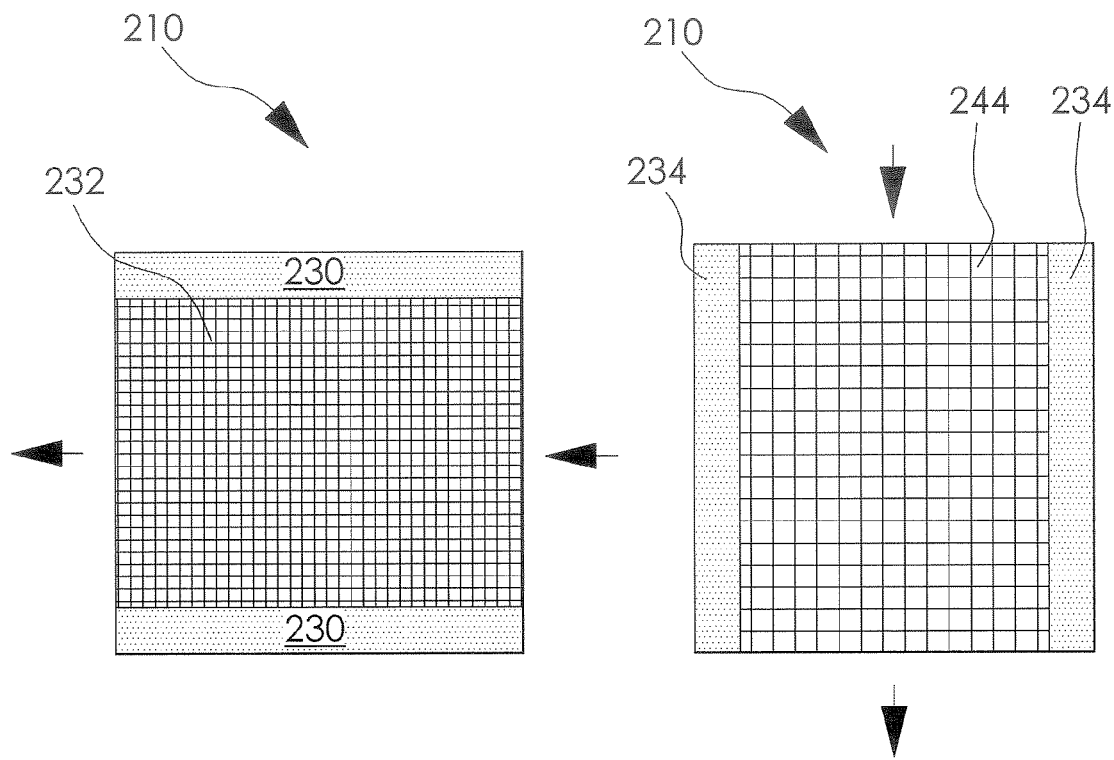
FIG. 5 is a top plan view of a dry fluid passage of the membrane humidifier of FIG. 2.
FIG. 6 is a top plan view of a wet fluid passage of the membrane humidifier of FIG. 2.

FIG. 1 schematically illustrates a membrane humidifier 10 for a cathode side of a fuel cell system (not shown). However, it is understood that the membrane humidifier 10 can be used for an anode side of the fuel cell system or otherwise as desired. The membrane humidifier 10 includes a wet side 12 adapted to receive a wet fluid, and a dry side 14 adapted to receive a dry fluid. As used herein, wet fluid means a fluid such as air and gas mixtures of $O_2$, $N_2$, $H_2O$, and $H_2$, for example, including water vapor and/or liquid water therein at a level above that of the dry fluid. Dry fluid means a fluid such as air and gas mixtures of $O_2$, $N_2$, $H_2O$, and $H_2$, for example, absent water vapor or including water vapor and/or liquid water therein at a level lower than that of the wet fluid. A pressure of the wet fluid caused to flow through the wet side 12 is lower than a pressure of the dry fluid caused to flow through the dry side 14. As shown in FIG. 1, flow channels 16 formed in the wet side 12 are adapted to convey the wet fluid from the cathode of the fuel cell system to an exhaust (not shown). Flow channels 18 formed in the dry side 14 are adapted to convey a dry fluid from a source of fluid (not shown) to the cathode of the fuel cell system. It is understood that other gases or mixtures of gases can be used as desired.

Figure 2:
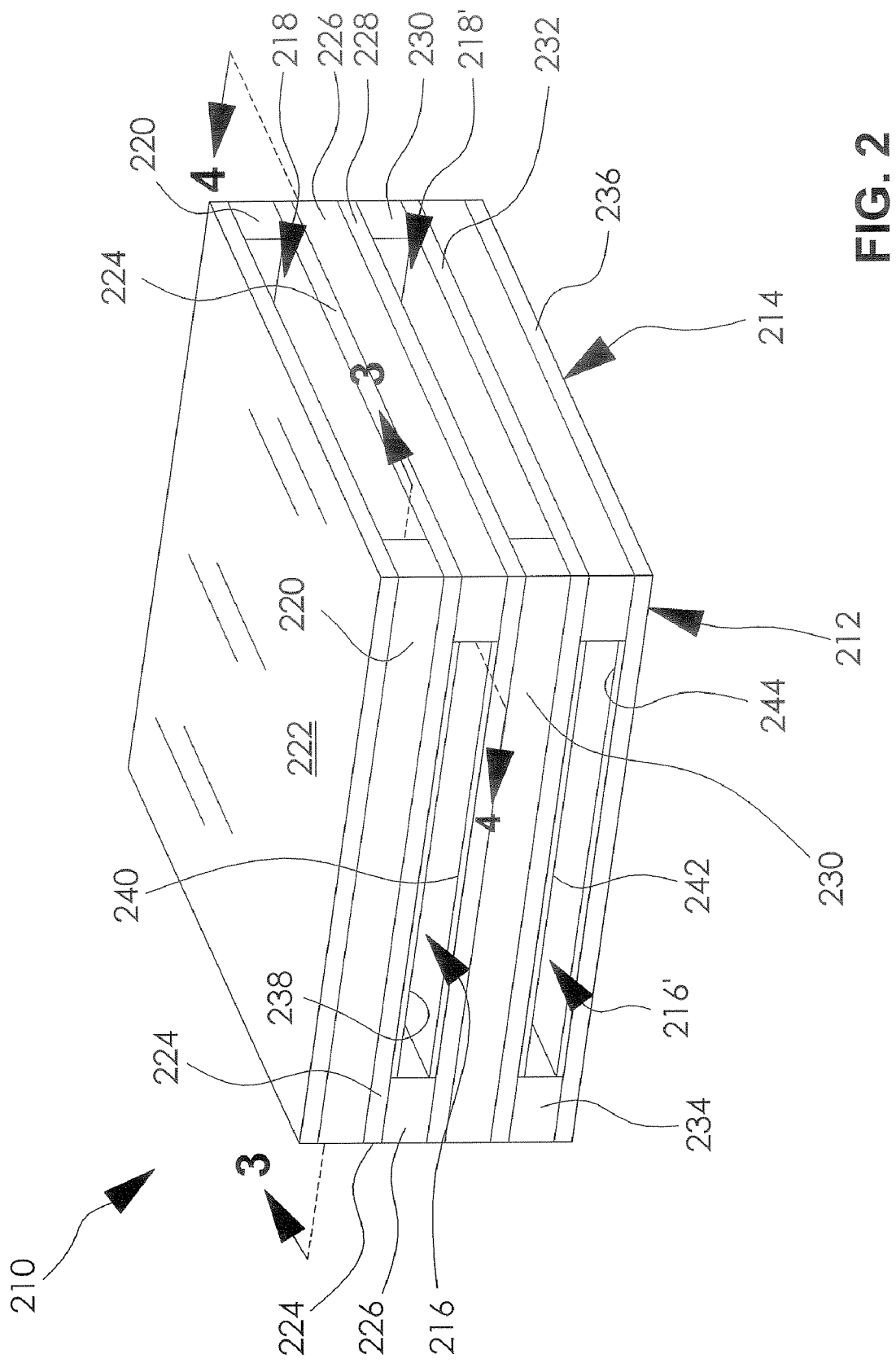
FIG. 2 is an enlarged perspective view of a portion of the membrane humidifier of FIG. 1.

In the embodiment shown in FIGS. 2-6, the membrane humidifier 210 includes a pair of flow channels 216, 216' to convey a wet fluid, and a pair of flow channels 218, 218' to convey a dry fluid. It is understood that any number of flow channels may be formed in the membrane humidifier 210, as desired. The flow channels 216, 216' of the wet side 212 are disposed perpendicular to the flow channels 218, 218' of the dry side 214 to provide a cross-flow configuration, as shown in FIG. 2. However, other configurations such as co-flow or counter-flow, for example, can be used as desired.

To form the membrane humidifier 210, a first pair of spaced apart sealing bars 220 is disposed between a first substantially planar membrane layer 222 and a second substantially planar membrane layer 224. The first pair of sealing bars 220 is adhered to peripheral edges of the first membrane layer 222 and the second membrane layer 224 to form a substantially fluid tight seal therebetween, thereby forming the flow channel 218. A second pair of spaced apart sealing bars 226 is disposed between the second membrane layer 224 and a third substantially planar membrane layer 228 perpendicular to the first pair of sealing bars 220. The second pair of sealing bars 226 is adhered to peripheral edges of the second membrane layer 224 and the third membrane layer 228 to form a substantially fluid tight seal therebetween, thereby forming the flow channel 216.

A third pair of spaced apart sealing bars 230 is disposed between the third membrane layer 228 and a fourth substantially planar membrane layer 232 parallel to the first pair of sealing bars 220. The third pair of sealing bars 230 is adhered to peripheral edges of the third membrane layer 228 and the fourth membrane layer 232 to form a substantially fluid tight seal therebetween, thereby forming the flow channel 218'. A fourth pair of spaced apart sealing bars 234 is disposed between the fourth membrane layer 232 and a fifth substantially planar membrane layer 236 perpendicular to the first pair of sealing bars 220. The fourth pair of sealing bars 234 is adhered to peripheral edges of the fourth membrane layer 232 and the fifth membrane layer 236 to form a substantially fluid tight seal therebetween, thereby forming the flow channel 216'.

In the embodiment shown in FIGS. 2-6, the sealing bars 220, 226, 230, 234 may be formed from one of a steel, a polymer, a graphite, and a composite material. The membrane layers 222, 224, 228, 232, 236 may be formed from any conventional membrane such as perfluorosulfonic acid (PFSA) such as the membrane sold under the trademark Nafion®, a hydrophilic polymer membrane, a hydrocarbon based membrane, and a polymer composite membrane, for example. Other materials can be used for the sealing bars 220, 226, 230, 234 and the membrane layers 222, 224, 228, 232 as desired.

A first support 238 is disposed adjacent the second membrane layer 224 and between the second pair of sealing bars 226, and a second support 240 is disposed adjacent the third membrane layer 228 extending between the second pair of sealing bars 226. The first support 238 and the second support 240 are adhered to the second membrane layer 224 and the third membrane layer 228, respectively. A third support 242 is disposed adjacent the fourth membrane layer 232 between the fourth pair of sealing bars 234, and a fourth support 244 is disposed adjacent the fifth membrane layer 236 between the fourth pair of sealing bars 234. The third support 242 and the fourth support 244 are adhered to the fourth membrane layer 232 and the fifth membrane layer 236, respectively. The supports 238, 240, 242, 244 may overlap a portion of the sealing bars 226, 234, as desired. The supports 238, 240, 242, 244 may be adhered to the sealing bars 226, 234, as desired. The supports 238, 240, 242, 244 may be formed from one of a foam, a corrugated metal foil, a screen, and a paper. The supports 238, 240, 242, 244 may also include a substantially planar array of elongate polymeric ribbons disposed between adjacent support layers to define a plurality of flow channels therebetween, similar to the membrane humidifier of commonly owned patent application Ser. No. 11/868,760, hereby incorporated herein by reference in its entirety. Supports may be disposed only in the channels formed in the wet side 212, as desired, because the flow of the wet fluid through the wet side 212 has a pressure lower than the pressure of the dry fluid flowing through the dry side 214. Therefore, only the fluid flowing through the dry side 214 imparts a force on a membrane of the membrane humidifier 210.

To assemble the membrane humidifier 210, an adhesive is applied to the sealing bars 220, 226, 230, 234 and/or the peripheral edges of the membrane layers 222, 224, 228, 232, 236. The adhesive may also be applied to the supports 238, 240, 242, 244 or the portion of the membrane layers 222, 224, 228, 232, 236 to which the supports 238, 240, 242, 244 will be adhered. The adhesive may be manually applied to the components just before assembly, or the adhesive may be formed on the components during manufacturing thereof in anticipation of a later assembly. Also, the various components, such as the supports 238, 240, 242, 244 and the membrane layers 222, 224, 228, 232, 236, for example, may be adhered together prior to final assembly of all of the components of the membrane humidifier 210. The adhesive may be one of a B-stage epoxy, ethylene vinyl acetate, polyvinylideneifluoride, a pressure sensitive adhesive, and any other conventional adhesive, for example, as desired.

Figure 3:
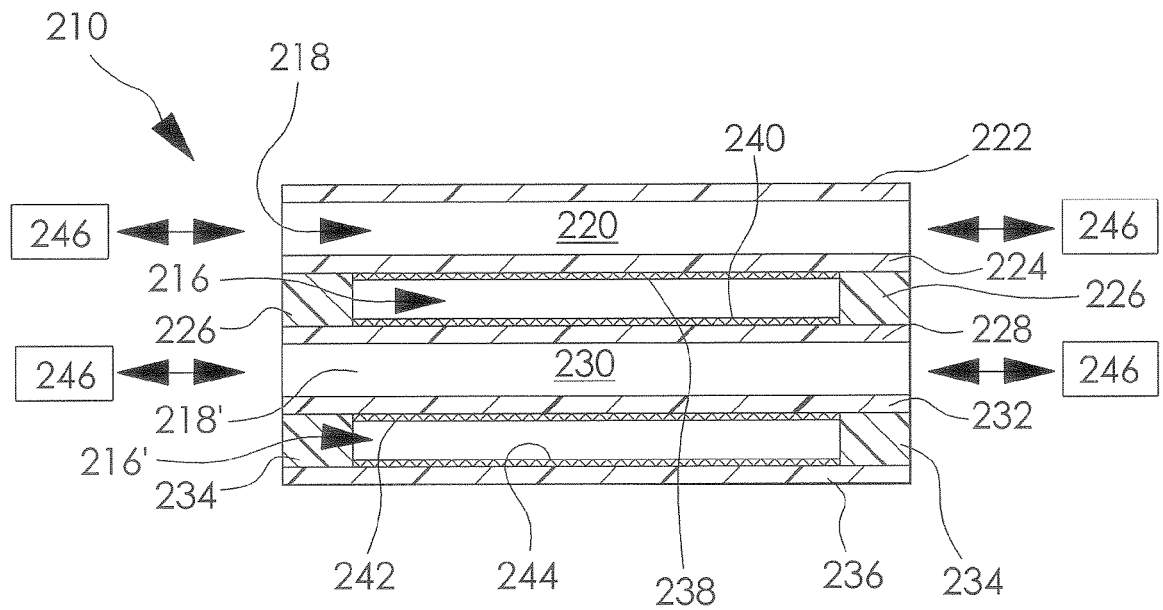
FIG. 3 is cross-sectional view of the membrane humidifier of FIG. 2 taken along line 3-3.
Figure 4:
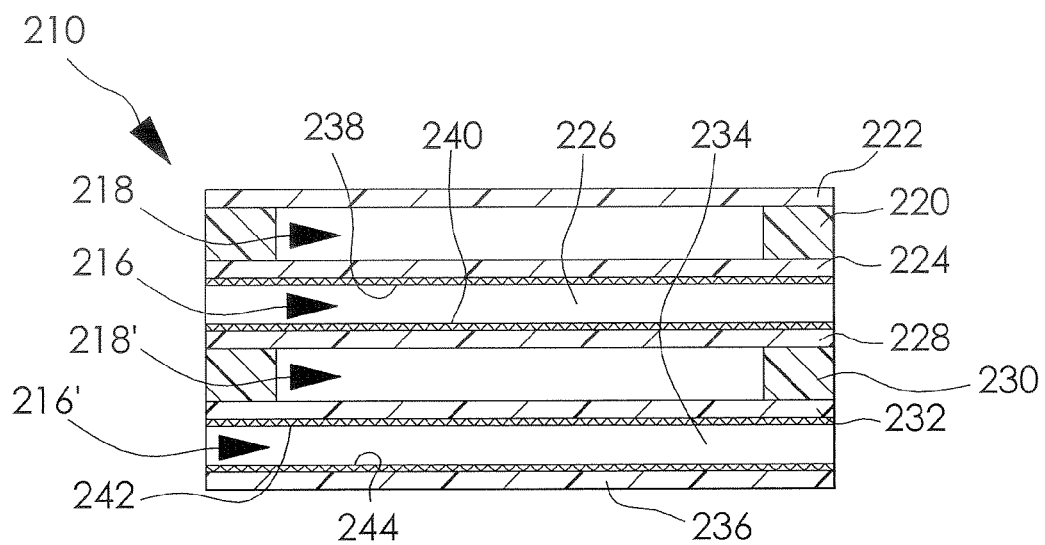
FIG. 4 is cross-sectional view of the membrane humidifier of FIG. 2 taken along line 4-4.

Once the adhesive is applied to the desired components of the membrane humidifier 210, a compressive load is applied to the membrane humidifier 210 to ensure a desired amount of adhesion of the various components to form a fluid tight seal therebetween to militate against an undesired leaking of reactant gases between the dry side 214 and the wet side 212. By sealing the components of the membrane humidifier 210 and militating against leaks, the stoichiometry of the reactants caused to flow through the fuel cell system and the performance of the fuel cell system is maximized. Further, by adhering the various components of the membrane humidifier 210 together without the use of manual fasteners, plates, and other components as known in the art, the complexity of assembly of the membrane humidifier 210 and weight thereof is minimized. By minimizing the weight of the membrane humidifier 210, the thermal mass of the membrane humidifier 210 is minimized, thereby increasing the efficiency of the membrane humidifier 210 and minimizing the warm-up time thereof. As shown in FIG. 3, a plurality of removable tools 246 adapted to support the membrane layers 222, 224, 228, 232 forming the flow channels 218, 218' may be disposed in the flow channels 218, 218' to militate against the deformation thereof during compression of the membrane humidifier 210. Once the membrane humidifier 210 is compressed and the various components thereof are adhered together, the tools 246 are removed from the flow channels 218, 218'.

In operation, a wet fluid is caused to flow through the flow channels 216, 216' formed in the wet side 212 of the membrane humidifier 210. The wet fluid is received from a supply of wet fluid, such from a cathode outlet of a fuel cell system. Any conventional means can be used to deliver the wet fluid to the flow channels 216, 216' such as a supply header in communication therewith, for example. The wet fluid exits the flow channels 216, 216' and is caused to flow to the exhaust. A dry fluid is caused to flow through the flow channels 218, 218' formed in the dry side 214. The dry fluid is received from a supply of dry fluid. Any conventional means can be used to deliver the dry fluid to the flow channels 218, 218' such as a compressor in communication with the flow channels 218, 218', for example. The dry fluid then exits the flow channels 218, 218' formed in the dry side 214 to a component of the fuel cell system such as a fuel cell stack supply header (not shown).

During flow of the wet fluid through the flow channels 216, 216' and the flow of the dry fluid through the flow channels 218, 218', the water molecular transport from the wet fluid to the dry fluid may involve the following modes: A) convection mass transport of water vapor in the flow channels 216, 216' of the wet side 212 and the flow channels 218, 218' of the dry side 214; B) diffusion transport through the membrane layers 224, 228, 232, 236 adjacent the flow channels 216, 216' of the wet side 212 and the membrane layers 222, 224, 228, 232 adjacent the flow channels 218, 218' of the dry side 214; and C) water vapor transport through the membrane layers 222, 224, 228, 232, 236 by diffusion. Additionally, if a pressure differential exists between the flow channels 216, 216' of the wet side 212 and the flow channels 218, 218' of the dry side 214, water is transferred through the membrane layers 222, 224, 228, 232, 236 by hydraulic forces. In addition, if the wet fluid and the dry fluid are at different temperatures, heat transfer from the hot fluid to the membrane layers 222, 224, 228, 232, 236 and from the membrane layers 222, 224, 228, 232, 236 to the cold fluid may also impact transfer of water. Water may also condense or vaporize in the bulk phases (i.e. either fluid may contain entrained liquid water at RH>100%). An enthalpy exchange may also be present between the wet fluid and the dry fluid associated with water flux.

FIGS. 7-11 illustrate a membrane humidifier 710 according to another embodiment of the invention. The embodiment of FIGS. 7-11 is similar to the membrane humidifier 210 of FIGS. 2-6 except as described below. Like the structure from FIGS. 2-6, FIGS. 7-11 includes reference numerals in the 700s instead of the 200s, with the remaining two digits the same.

Figure 7:
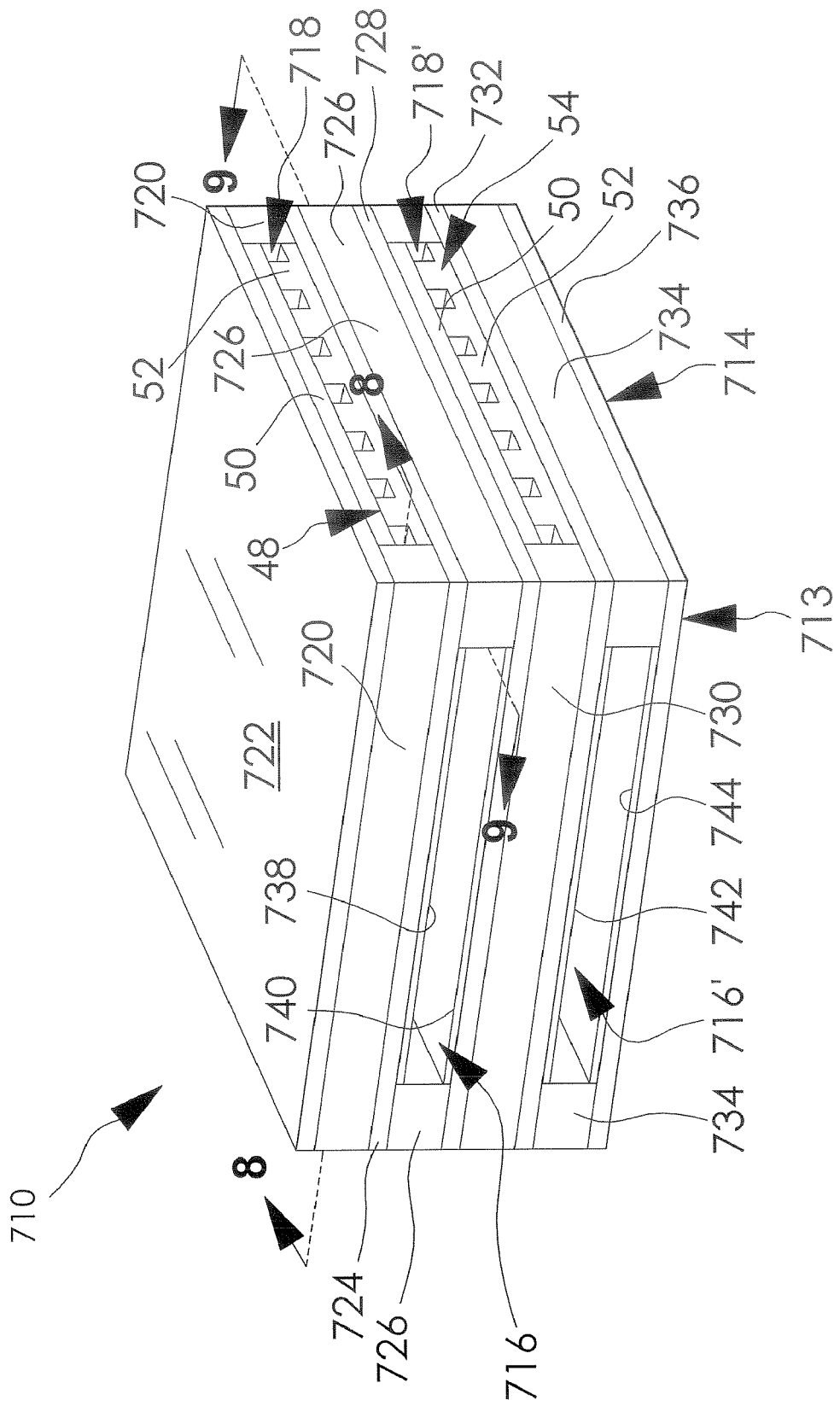
FIG. 7 is a perspective view of a portion of a membrane humidifier according to another embodiment of the invention.
Figure 8:
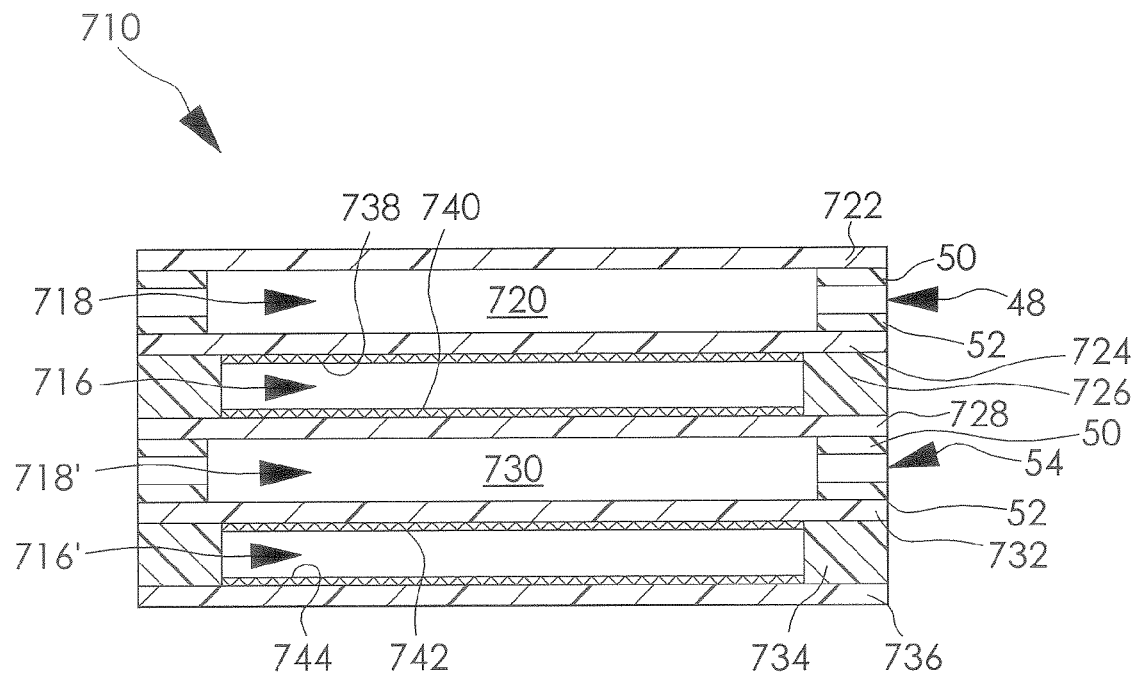
FIG. 8 is cross-sectional view of the membrane humidifier of FIG. 7 taken along line 8-8.
Figure 9:
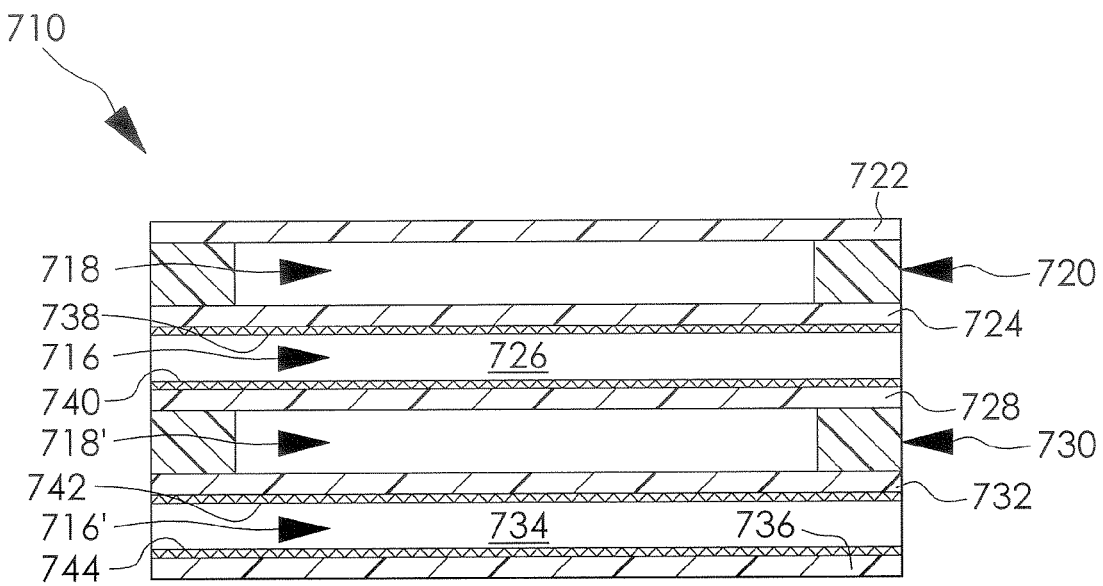
FIG. 9 is cross-sectional view of the membrane humidifier of FIG. 7 taken along line 9-9.
Figure 10:
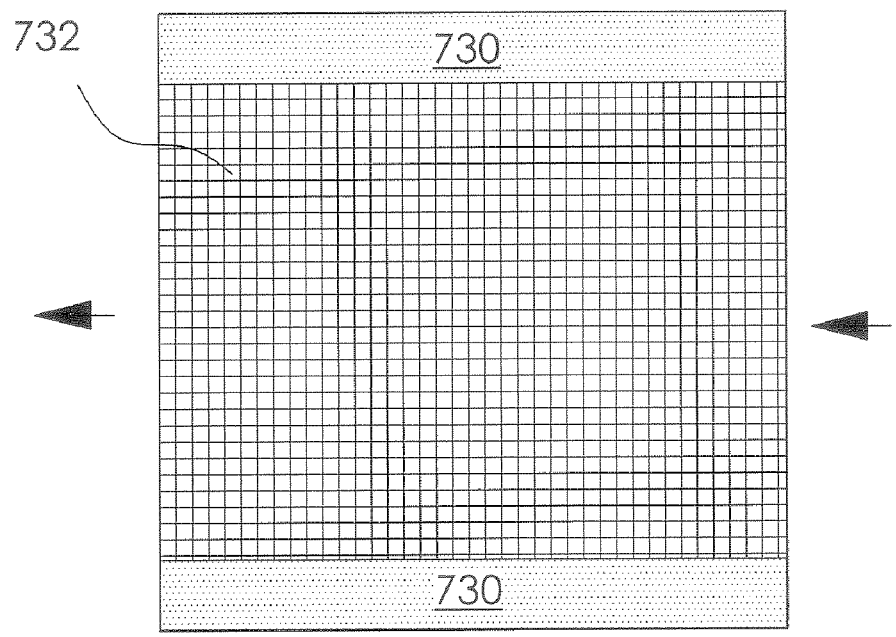
FIG. 10 is a top plan view of a wet fluid passage of the membrane humidifier of FIG. 7.
Figure 11:
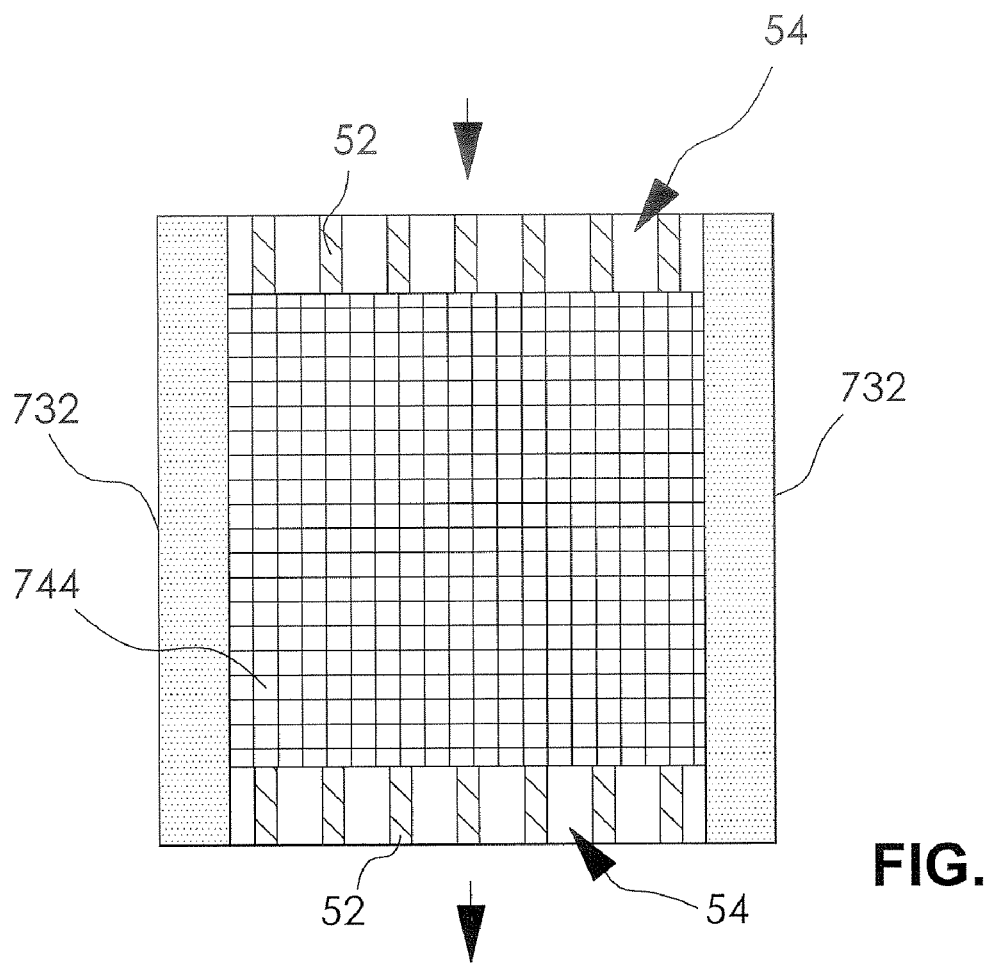
FIG. 11 is a top plan view of a dry fluid passage of the membrane humidifier of FIG. 7.

In the embodiment shown in FIGS. 7-11, the membrane humidifier 710 includes a pair of flow channels 716, 716' to convey a wet fluid, and a pair of flow channels 718, 718' to convey a dry fluid. It is understood that any number of flow channels may be formed in the membrane humidifier 710, as desired. The flow channels 716, 716' of a wet side 712 are disposed perpendicular to the flow channels 718, 718' of a dry side 714 to provide a cross-flow configuration, as shown in FIG. 7. However, other configurations such as co-flow or counter-flow, for example, can be used as desired.

To form the membrane humidifier 710, a first pair of spaced apart sealing bars 720 is disposed between a first substantially planar membrane layer 722 and a second substantially planar membrane layer 724. The first pair of sealing bars 720 is adhered to peripheral edges of the first membrane layer 722 and the second membrane layer 724 to form a substantially fluid tight seal therebetween, thereby forming the flow channel 718. A second pair of spaced apart sealing bars 726 is disposed between the second membrane layer 724 and a third substantially planar membrane layer 728 perpendicular to the sealing bars 720. The second pair of sealing bars 726 is adhered to peripheral edges of the second membrane layer 724 and the third membrane layer 728 to form a substantially fluid tight seal therebetween, thereby forming the flow channel 716. A third pair of spaced apart sealing bars 730 is disposed between the third membrane layer 728 and a fourth substantially planar membrane layer 732 parallel to the first pair of sealing bars 720. The third pair of sealing bars 730 is adhered to peripheral edges of the third membrane layer 728 and the fourth membrane layer 732 to form a substantially fluid tight seal therebetween, thereby forming the flow channel 718'. A fourth pair of spaced apart sealing bars 734 is disposed between the fourth membrane layer 732 and a fifth substantially planar membrane layer 736 perpendicular to the first pair of sealing bars 720. The fourth pair of sealing bars 734 is adhered to peripheral edges of the fourth membrane layer 732 and the fifth membrane layer 736 to form a substantially fluid tight seal therebetween, thereby forming the flow channel 716'. In the embodiment shown in FIGS. 7-11, the sealing bars 720, 726, 730, 734 may be formed from one of a steel, a polymer, a graphite, and a composite material, as desired. The membrane layers 722, 724, 728, 732, 736 may be formed from any conventional membrane such as perfluorosulfonic acid (PFSA) such as the membrane sold under the trademark Nafion®, a hydrophilic polymer membrane, a hydrocarbon based membrane, and a polymer composite membrane, for example. Other materials can be used for the sealing bars 720, 726, 730, 734 and the membrane layers 722, 724, 728, 732, 736 as desired.

A first pair of spaced apart perforated sealing bars 48 is disposed between the first membrane layer 722 and the second membrane layer 724, and extends between the first pair of sealing bars 720. The first pair of perforated sealing bars 48 is adhered to peripheral edges of the first membrane layer 722 and the second membrane layer 724. A second pair of spaced apart perforated sealing bars 54 is disposed between the third membrane layer 728 and the fourth membrane layer 732, and extends between the third pair of sealing bars 730. The second pair of perforated sealing bars 54 is adhered to peripheral edges of the third membrane layer 728 and the fourth membrane layer 732. In the embodiment shown, the perforated sealing bars 48, 54 are formed from a substantially planar member 50 disposed adjacent to and adhered to a crenellated member 52, thereby forming apertures therein in fluid communication with the respective flow channels 718, 718'. It is understood that the perforated sealing bars 48, 54 may be formed from a single member having apertures, as desired. The perforated sealing bars 48, 54 may be formed from one of a steel, a polymer, a graphite, and a composite material, as desired.

A first support 738 is disposed adjacent the second membrane layer 724 and between the second pair of sealing bars 726, and a second support 740 is disposed adjacent the third membrane layer 728 and extending between the second pair of sealing bars 726. The first support 738 and the second support 740 are adhered to the second membrane layer 724 and the third membrane layer 728, respectively. A third support 742 is disposed adjacent the fourth membrane layer 732 between the fourth pair of sealing bars 734, and a fourth support 744 is disposed adjacent the fifth membrane layer 736 between the fourth pair of sealing bars 734. The third support 742 and the fourth support 744 are adhered to the fourth membrane layer 732 and the fifth membrane layer 736, respectively. The supports 738, 740, 742, 744 are adapted to militate against a deflection or distortion of the membrane layers 722, 724, 728, 732, 736 caused by fluid flowing through the dry side 714 of the membrane humidifier. The supports 738, 740, 742, 744 may overlap a portion of the sealing bars 726, 734, as desired. The supports 738, 740, 742, 744 may be adhered to the sealing bars 726, 734, as desired. The supports 738, 740, 742, 744 may be formed from one of a foam, a corrugated metal foil, a screen, and a paper. The supports 738, 740, 742, 744 may also include a substantially planar array of elongate polymeric ribbons disposed between adjacent support layers to define a plurality of flow channels therebetween. Supports may be disposed only in the channels formed in the wet side 712, as desired, because the flow of the wet fluid through the wet side 712 has a pressure lower than the pressure of the dry fluid flowing through the dry side 714. Therefore, only the fluid flowing through the dry side 714 imparts a force on a membrane layer of the membrane humidifier 710.

To assemble the membrane humidifier 710, an adhesive is applied to the sealing bars 720, 726, 730, 734, 48, 54 and/or the peripheral edges of the membrane layers 722, 724, 728, 732, 736. The adhesive may also be applied to the supports 738, 740, 742, 744 or the portion of the membrane layers 722, 724, 728, 732, 736 to which the supports 738, 740, 742, 744 will be adhered. The adhesive may be manually applied to the components just before assembly, or the adhesive may be formed on the components during manufacturing thereof in anticipation of a later assembly. Also, the various components, such as the supports 738, 740, 742, 744 and the membrane layers 722, 724, 728, 732, 736, for example, may be adhered together prior to final assembly of all of the components of the membrane humidifier 710. The adhesive may be one of a B-stage epoxy, ethylene vinyl acetate, polyvinylideneifluoride, a pressure sensitive adhesive, and any other conventional adhesive, for example, as desired.

Once the adhesive is applied to the desired components of the membrane humidifier 710, a compressive load is applied to the membrane humidifier 710 to ensure a desired amount of adhesion of the various components to form a fluid tight seal therebetween to militate against an undesired leaking of reactant gases between the dry side 714 and the wet side 712. By sealing the components of the membrane humidifier 710 and militating against leaks, the stoichiometry of the reactants caused to flow through the fuel cell system and the performance of the fuel cell system is maximized. Further, by adhering the various components of the membrane humidifier 710 together without the use of manual fasteners, plates, and other components as known in the art, the complexity of assembly of the membrane humidifier 710 and weight thereof is minimized. By minimizing the weight of the membrane humidifier 710, the thermal mass of the membrane humidifier 710 is minimized, thereby increasing the efficiency of the membrane humidifier 710 and minimizing the warm-up time thereof. As shown in FIG. 7, the perforated sealing bars 48, 54 are adapted to support the membrane layers 722, 724, 728, 732 during the compression of the membrane humidifier 710 while also facilitating the flow of dry fluid through the apertures formed therein. The perforated sealing bars 48, 54 are adapted to support the membrane layers 722, 724, 728, 732 forming the flow channels 718, 718' to militate against the deformation thereof during compression.

In operation, a dry fluid is caused to flow through the apertures formed in the perforated sealing bars 48, 54, through the flow channels 718, 718' formed in the dry side 714, through the apertures formed in the remaining perforated sealing bars 48, 54, and then to a component of the fuel cell system such as a fuel cell stack supply header (not shown).

The dry fluid is received from a supply of dry fluid. Any conventional means can be used to deliver the dry fluid to the flow channels 718, 718' such as a compressor in communication therewith, for example. A wet fluid is caused to flow through the flow channels 716, 716' formed in the wet side 712. The wet fluid is received from a supply of wet fluid, such from a cathode outlet of a fuel cell system. Any conventional means can be used to deliver the wet fluid to the flow channels 716, 716' such as a supply header in communication with the flow channels 716, 716', for example. The wet fluid then exits the flow channels 718, 718' formed in the wet side 712 and to the exhaust.

Figure 12:
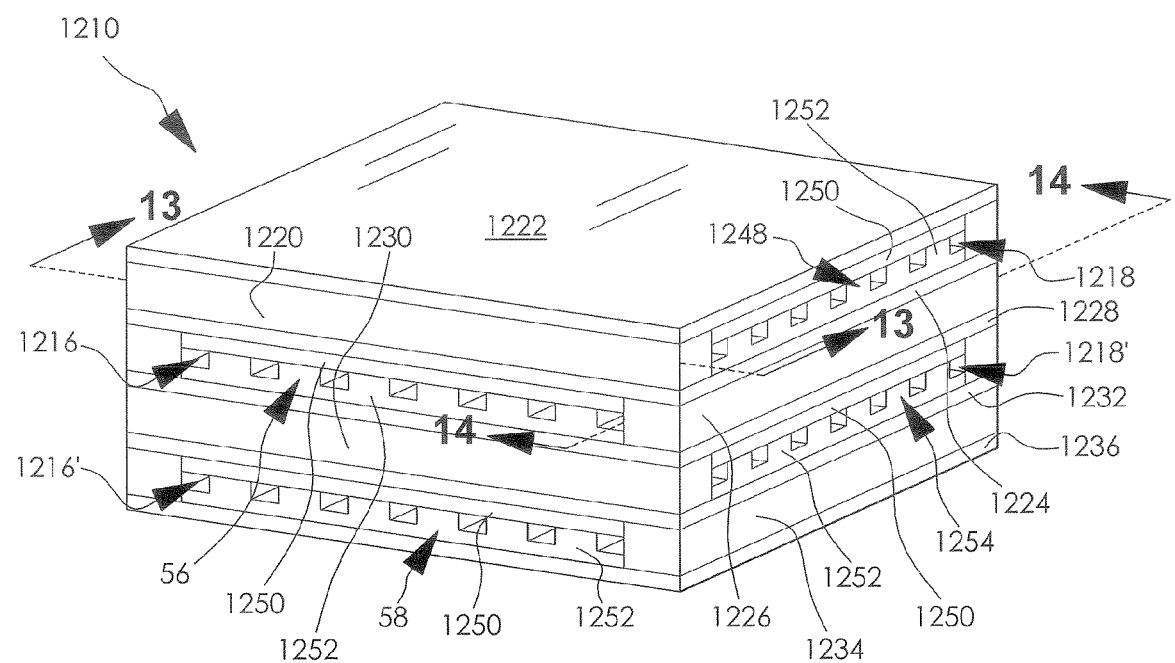
FIG. 12 is a perspective view of a portion of a membrane humidifier according to another embodiment of the invention.
Figure 13:
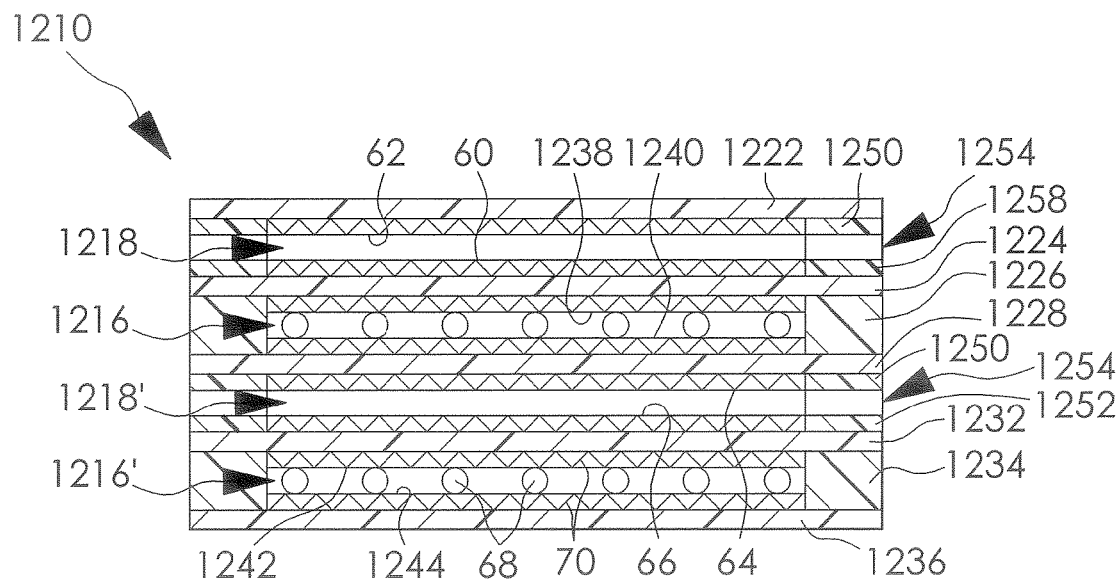
FIG. 13 is cross-sectional view of the membrane humidifier of FIG. 12 taken along line 13-13.
Figure 14:
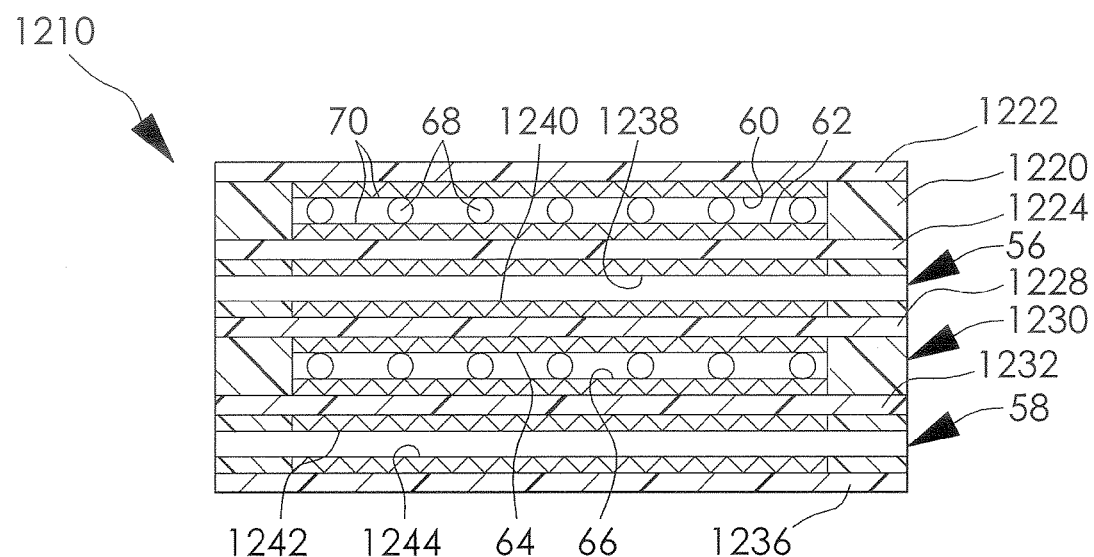
FIG. 14 is cross-sectional view of the membrane humidifier of FIG. 12 taken along line 14-14.

FIGS. 12-14 illustrate a membrane humidifier 1210 according to another embodiment of the invention. The embodiment of FIGS. 12-14 is similar to the membrane humidifier 710 of FIGS. 7-11 except as described below. Like the structure from FIGS. 7-11, FIGS. 12-14 includes reference numerals in the 1200s instead of the 700s, with the remaining two digits the same.

In the embodiment shown in FIGS. 12-14, the membrane humidifier 1210 includes a pair of flow channels 1216, 1216' to convey a wet fluid, and a pair of flow channels 1218, 1218' to convey a dry fluid. It is understood that any number of flow channels may be formed in the membrane humidifier 1210, as desired. The flow channels 1216, 1216' of the wet side 1212 are disposed perpendicular to the flow channels 1218, 1218' of the dry side 1214 to provide a cross-flow configuration, as shown in FIG. 12. However, other configurations such as parallel flow, for example, can be used as desired.

To form the membrane humidifier 1210, a first pair of spaced apart sealing bars 1220 is disposed between a first substantially planar membrane layer 1222 and a second substantially planar membrane layer 1224. The first pair of sealing bars 1220 is adhered to peripheral edges of the first membrane layer 1222 and the second membrane layer 1224 to form a substantially fluid tight seal therebetween, thereby forming the flow channel 1218. A second pair of spaced apart sealing bars 1226 is disposed between the second membrane layer 1224 and a third substantially planar membrane layer 1228 perpendicular to the first pair of sealing bars 1220. The second pair of sealing bars 1226 is adhered to peripheral edges of the second membrane layer 1224 and the third membrane layer 1228 to form a substantially fluid tight seal therebetween, thereby forming the flow channel 1216. A third pair of spaced apart sealing bars 1230 is disposed between the third membrane layer 1228 and a fourth substantially planar membrane layer 1232 parallel to the first pair of sealing bars 1220. The third pair of sealing bars 1230 is adhered to peripheral edges of the third membrane layer 1228 and the fourth membrane layer 1232 to form a substantially fluid tight seal therebetween, thereby forming the flow channel 1218'. A fourth pair of spaced apart sealing bars 1234 is disposed between the fourth membrane layer 1232 and a fifth substantially planar membrane layer 1236 perpendicular to the first pair of sealing bars 1220. The fourth pair of sealing bars 1234 is adhered to peripheral edges of the fourth membrane layer 1232 and the fifth membrane layer 1236 to form a substantially fluid tight seal therebetween, thereby forming the flow channel 1216'.

In the embodiment shown in FIGS. 12-14, the sealing bars 1220, 1226, 1230, 1234 may be formed from one of a steel, a polymer, a graphite, and a composite material, as desired. The membrane layers 122, 1224, 1228, 1232, 1236 may be formed from any conventional membrane such as perfluorosulfonic acid (PFSA) such as the membrane sold under the trademark Nafion®, a hydrophilic polymer membrane, a hydrocarbon based membrane, and a polymer composite membrane, for example. Other materials can be used for the sealing bars 1220, 1226, 1230, 1234 and the membrane layers 1222, 1224, 1228, 1232, 1236 as desired.

A first pair of spaced apart perforated sealing bars 1248 is disposed between the first membrane layer 1222 and the second membrane layer 1224, and extends between the first pair of sealing bars 1220. The first pair of sealing bars 1248 is adhered to peripheral edges of the first membrane layer 1222 and the second membrane layer 1224. A second pair of spaced apart perforated sealing bars 1254 is disposed between the third membrane layer 1228 and the fourth membrane layer 1232, and extends between the third pair of sealing bars 1230. The second pair of perforated sealing bars 1254 is adhered to peripheral edges of the third membrane layer 1228 and the fourth membrane layer 1232. A third pair of spaced apart perforated sealing bars 56 is disposed between the second membrane layer 1224 and a third membrane layer 1228, and extends between the second pair of sealing bars 1226. The third pair of perforated sealing bars 56 is adhered to peripheral edges of the second membrane layer 1224 and the third membrane layer 1228. It is understood that the third pair of perforated sealing bars 56 may be formed from a single member having apertures, as desired. A fourth pair of spaced apart perforated sealing bars 58 is disposed between the fourth membrane layer 1232 and a firth membrane layer 1236, and extends between the fourth pair of sealing bars 1234. The fourth pair of perforated sealing bars 58 is adhered to peripheral edges of the fourth membrane layer 1232 and the fifth membrane layer 1236. In the embodiment shown, the perforated sealing bars 1248, 1254, 56, 58 are formed from a substantially planar member 1250 disposed adjacent to and adhered to a crenellated member 1252, thereby forming apertures therein in fluid communication with the respective flow channels 1218, 1218', 1216, 1216'. It is understood that the perforated sealing bars 1248, 1254, 56, 58 may be formed from a single member having apertures, as desired. In the embodiment shown in FIGS. 12-14, the perforated sealing bars 1248, 1254, 56, 58 may be formed from one of a steel, a polymer, a graphite, and a composite material, as desired.

A first support 1238 is disposed adjacent the second membrane layer 1224 and between the second pair of sealing bars 1226, and a second support 1240 is disposed adjacent the third membrane layer 1228 between the sealing bars 1226. The first support 1238 and the second support 1240 are adhered to the second membrane layer 1224 and the third membrane layer 1228, respectively. A third support 1242 is disposed adjacent the fourth membrane layer 1232 between the fourth pair of sealing bars 1234, and a fourth support 1244 is disposed adjacent the fifth membrane layer 1236 between the fourth pair of sealing bars 1234. The third support 1242 and the fourth support 1244 are adhered to the fourth membrane layer 1232 and the fifth membrane layer 1236, respectively.

A fifth support 60 is disposed adjacent the first membrane layer 1222 and between the first pair of sealing bars 1220, and a sixth support 62 is disposed adjacent the second membrane layer 1224 between the first pair of sealing bars 1220. The fifth support 60 and the sixth support 62 are adhered to the first membrane layer 1222 and the second membrane layer 1224, respectively. A seventh support 64 is disposed adjacent the third membrane layer 1228 and between the third pair of sealing bars 1230, and an eighth support 66 is disposed adjacent the fourth membrane layer 1232 between the third pair of sealing bars 1230. The seventh support 64 and the eighth support 66 are adhered to the third membrane layer 1228 and the fourth membrane layer 1232, respectively.

The supports 1238, 1240, 1242, 1244, 60, 62, 64, 66 are adapted to militate against a deflection or distortion of the membrane layers 1222, 1224, 1228, 1232, 1236 caused by fluid flowing through the dry side 714 of the membrane humidifier. The supports 1238, 1240, 1242, 1244, 60, 62, 64, 66 may overlap a portion of the sealing bars 1220, 1226, 1230, 1234, as desired. The supports 1238, 1240, 1242, 1244, 60, 62, 64, 66 may be adhered to the sealing bars 1220, 1226, 1230, 1234, as desired. In the embodiment shown in FIGS. 12-14, the supports 1238, 1240, 1242, 1244, 60, 62, 64, 66 are formed from a plurality of substantially planar array of elongate polymeric ribbons 68 disposed between adjacent substantially planar members 70 formed from one of a foam, a corrugated metal foil, a screen and a paper. The ribbons 68 and the planar members 70 cooperate to define a plurality of flow channels therebetween. Supports may be disposed only in the channels formed in the wet side 1212, as desired, because the flow of the wet fluid through the wet side 1212 has a pressure lower than the pressure of the dry fluid flowing through the dry side 1214. Therefore, only the fluid flowing through the dry side 1214 imparts a force on a membrane layer of the membrane humidifier 1210.

To assemble the membrane humidifier 1210, an adhesive is applied to the sealing bars 1220, 1226, 1230, 1234, 1248, 1254, 56, 58 and/or the peripheral edges of the membrane layers 1222, 1224, 1228, 1232, 1236. The adhesive may also be applied to the supports 1238, 1240, 1242, 1244, 60, 62, 64, 66 or the portion of the membrane layers 1222, 1224, 1228, 1232, 1236 to which the supports 1238, 1240, 1242, 1244, 60, 62, 64, 66 will be adhered. The adhesive may be manually applied to the components just before assembly, or the adhesive may be formed on the components during manufacturing thereof in anticipation of a later assembly. Also, the various components, such as the supports 1238, 1240, 1242, 1244, 60, 62, 64, 66 and the membrane layers 1222, 1224, 1228, 1232, 1236, for example, may be adhered together prior to final assembly of all of the components of the membrane humidifier 1210. The adhesive may be one of a B-stage epoxy, ethylene vinyl acetate, polyvinylideneifluoride, a pressure sensitive adhesive, and any other conventional adhesive, for example, as desired. Once the adhesive is applied to the desired components of the membrane humidifier 1210, a compressive load is applied to the membrane humidifier 1210 to ensure a desired amount of adhesion of the various components to form a fluid tight seal therebetween to militate against an undesired leaking of reactant gases between the dry side 1214 and the wet side 1212. By sealing the components of the membrane humidifier 1210 and militating against leaks, the stoichiometry of the reactants caused to flow through the fuel cell system and the performance of the fuel cell system is maximized. Further, by adhering the various components of the membrane humidifier 1210 together without the use of manual fasteners, plates, and other components as known in the art, the complexity of assembly of the membrane humidifier 1210 and weight thereof is minimized. By minimizing the weight of the membrane humidifier 1210, the thermal mass of the membrane humidifier 1210 is minimized, thereby increasing the efficiency of the membrane humidifier 1210 and minimizing the warm-up time thereof. As shown in FIG. 12, the perforated sealing bars 1248, 1254, are adapted to support the membrane layers 1222, 1224, 1228, 1232 during the compression of the membrane humidifier 1210 while also facilitating the flow of dry fluid through the apertures formed therein. The perforated sealing bars 1248, 1254 are adapted to support the membrane layers 1222, 1224, 1228, 1232 forming the flow channels 1218, 1218' to militate against the deformation thereof during compression. The perforated sealing bars 56, 58 are adapted to support the membrane layers 1224, 1228, 1232, 1236 during the compression of the membrane humidifier 1210 while also facilitating the flow of wet fluid through the apertures formed therein. The perforated sealing bars 56, 58 are adapted to support the membrane layers 1224, 1228, 1232, 1236 forming the flow channels 1216, 1216' to militate against the deformation thereof during compression.

In operation, a dry fluid is caused to flow through the apertures formed in the perforated sealing bars 1248, 1254, through the flow channels 1218, 1218' formed in the dry side 1214, through the apertures formed in the remaining perforated sealing bars 1248, 1254, and then to a component of the fuel cell system such as a fuel cell stack supply header (not shown). The dry fluid is received from a supply of dry fluid. Any conventional means can be used to deliver the dry fluid to the flow channels 1218, 1218' such as a compressor in communication therewith, for example. A wet fluid is caused to flow through the apertures formed in the perforated sealing bars 56, 58, through the flow channels 1216, 1216' formed in the wet side 1212, through the apertures formed in the remaining perforated sealing bars 56, 58, and then to the exhaust.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A membrane humidifier assembly for a fuel cell comprising:
    a first substantially planar membrane layer,
    a second substantially planar membrane layer spaced apart from said first layer;
    a third substantially planar membrane layer spaced apart from said second layer;
    a first pair of spaced apart sealing bars disposed between said first layer and said second layer adjacent peripheral edges thereof to form a first flow channel therebetween;
    a second pair of spaced apart sealing bars disposed between said second layer and said third layer adjacent peripheral edges thereof to form a second flow channel therebetween;
    a first support disposed adjacent said second layer and extending between said second pair of sealing bars; and
    a second support disposed adjacent said third planar layer and extending between said second pair of sealing bars.

2. The membrane humidifier according to claim 1, further including a first plurality of perforated sealing bars disposed between said first layer and said second layer adjacent peripheral edges thereof and extending between said first pair of sealing bars.

3. The membrane humidifier according to claim 1, further including a second plurality of perforated sealing bars disposed between said second layer and said third layer adjacent peripheral edges thereof and extending between said second pair of sealing bars.

4. The membrane humidifier according to claim 1, further including a third support disposed adjacent said first layer and extending between said first pair of sealing bars and a fourth support disposed adjacent said second layer and extending between said first pair of sealing bars.

5. The membrane humidifier according to claim 1, wherein said first support and said second support are formed from one of a foam, a corrugated metal foil, a screen, and a paper.

6. The membrane humidifier according to claim 1, further including a substantially planar array of elongate ribbons disposed between said first support and said second support to define a plurality of flow channels therebetween, said ribbons produced from a polymeric material.

7. The membrane humidifier according to claim 1, wherein said first pair of sealing bars is adhered to said first layer and said second layer and said second pair of sealing bars is adhered to said second layer and said third layer with at least one of a B-stage epoxy, ethylene vinyl acetate, polyvinylideneifluoride, and a pressure sensitive adhesive.

8. The membrane humidifier according to claim 1, wherein said first support is adhered to said second layer and said second support is adhered to said third layer with at least one of a B-stage epoxy, ethylene vinyl acetate, polyvinylideneifluoride, and a pressure sensitive adhesive.

9. The membrane humidifier according to claim 1, wherein said membrane is one of a perfluorosulfonic acid, a hydrophilic polymer membrane, a hydrocarbon based membrane, and a polymer composite membrane.

10. The membrane humidifier according to claim 1, wherein said first pair of sealing bars and said second pair of sealing bars are formed from at least one of a steel, a polymer, graphite, and a composite material.

11. The membrane humidifier according to claim 1, wherein the second flow channel is adapted to receive a humidified fluid and the first flow channel is adapted to receive a fluid having a humidity lower than the humidified fluid.

12. The membrane humidifier according to claim 1, wherein the first flow channel is substantially perpendicular to the second flow channel.

13. The membrane humidifier according to claim 1, further including a removable tool disposed in the first flow channel and adapted to support said first membrane layer and the second membrane layer forming the first flow channel, wherein said tool militates against the deformation of said first membrane and said second membrane layer during compression of the membrane humidifier.

14. A membrane humidifier assembly for a fuel cell comprising:
    a first substantially planar membrane layer;
    a second substantially planar membrane layer spaced apart from said first layer;
    a third substantially planar membrane layer spaced apart from said second layer;
    a first pair of spaced apart sealing bars disposed between said first layer and said second layer adjacent peripheral edges thereof to form a first flow channel therebetween;
    a first plurality of perforated sealing bars disposed between said first layer and said second layer adjacent peripheral edges thereof and extending between said first pair of sealing bars;
    a second pair of spaced apart sealing bars disposed between said second layer and said third layer adjacent peripheral edges thereof to form a second flow channel therebetween;
    a first support disposed adjacent said second layer and extending between said second pair of sealing bars; and
    a second support disposed adjacent said third planar layer and extending between said second pair of sealing bars.

15. The membrane humidifier according to claim 14, further including a third support disposed adjacent said first layer and extending between said first pair of sealing bars and a fourth support disposed adjacent said second layer and extending between said first pair of sealing bars.

16. The membrane humidifier according to claim 14, further including a substantially planar array of elongate ribbons disposed between said first support and said second support to define a plurality of flow channels therebetween, said ribbons produced from a polymeric material.

17. The membrane humidifier according to claim 14, wherein said first pair of sealing bars is adhered to said first layer and said second layer, and said second pair of sealing bars is adhered to said second layer and said third layer with at least one of a B-stage epoxy, ethylene vinyl acetate, polyvinylideneifluoride, and a pressure sensitive adhesive.

18. A method for making a membrane humidifier for a fuel cell system, the method comprising the steps of:
   providing a plurality of spaced apart and substantially planar layers formed from a membrane, a plurality of sealing bars, and a plurality of supports;
   providing a first pair of sealing bars and adhering said first pair of sealing bars between a first planar layer and a second planar layer adjacent to peripheral edges thereof to form a first flow channel;
   providing a second pair of sealing bars and adhering said second pair of sealing bars between the second planar layer and a third planar layer adjacent to peripheral edges thereof to form a second flow channel;
   providing a first support disposed adjacent to the second planar layer and extending between the second pair of sealing bars and adhering the first support to the second planar layer; and
   providing a second support disposed adjacent to the third planar layer and extending between the second pair of sealing bars and adhering the second support to the third planar layer.

19. The method of claim 18, further including the step of providing a first plurality of perforated sealing bars disposed between the first layer and the second layer adjacent peripheral edges thereof and extending between the first pair of sealing bars and a second plurality of perforated sealing bars disposed between the second layer and the third layer adjacent peripheral edges thereof and extending between the second pair of sealing bars.

20. The method of claim 18, further including the step of disposing a removable tool in the first flow channel and adapted to support the first membrane layer and the second membrane layer forming the first flow channel, wherein the tool militates against the deformation of the first membrane and the second membrane layer during compression of the membrane humidifier.

\* \* \* \* \*